United States Patent
O'Connor et al.

(10) Patent No.: US 10,764,722 B2
(45) Date of Patent: Sep. 1, 2020

(54) SUBSCRIBER SAMPLING FOR NETWORK PACKET FORWARDING BASED UPON UNIQUE SUBSCRIBER IDENTIFIERS

(71) Applicant: Keysight Technologies, Inc., Minneapolis, MN (US)

(72) Inventors: Robin O'Connor, Austin, TX (US); Shardendu Pandey, Austin, TX (US); Bogdan Tenea, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 15/880,110

(22) Filed: Jan. 25, 2018

(65) Prior Publication Data
US 2019/0222965 A1    Jul. 18, 2019

(30) Foreign Application Priority Data
Jan. 12, 2018    (RO) .............................. a 2018 00011

(51) Int. Cl.
*H04W 4/06*    (2009.01)
*H04W 4/20*    (2018.01)
(Continued)

(52) U.S. Cl.
CPC .............. *H04W 4/06* (2013.01); *H04W 4/20* (2013.01); *H04W 8/18* (2013.01); *H04L 65/1006* (2013.01); *H04W 4/60* (2018.02)

(58) Field of Classification Search
CPC ... H04L 43/026; H04L 43/0811; H04L 43/12; H04L 47/2441; H04L 63/1408;
(Continued)

(56) References Cited

U.S. PATENT DOCUMENTS 6,469,998 B1    10/2002 Salinas et al.
6,871,265 B1    3/2005 Oren et al.
(Continued)

OTHER PUBLICATIONS

Gigamon, Application Note, Subscriber-Aware Visibility Rethinking Operator Infrastructure Monitoring (Year: 2016).*
(Continued)

*Primary Examiner* — Harun Chowdhury

(57) ABSTRACT

Systems and methods are disclosed for subscriber sampling for network packet forwarding based upon unique subscriber identifiers. Control packets within input packets are processed to identify unique subscriber identifiers and related session identifiers, which are stored in records within a tracking table. Each input packet is analyzed to extract a session identifier and a unique subscriber identifier if present within the input packet. When a unique subscriber identifier is not present, the tracking table is accessed to determine a unique subscriber identifier associated with the session identifier extracted from the packet. The input packet is sampled based upon the unique subscriber identifier to determine whether or not to output the input packet as a sampled packet. The subscriber sampling can include hash-based sampling, dynamic function based sampling, and/or other subscriber/call based sampling methods. Sampled packets are forwarded to egress port(s) for further processing.

20 Claims, 4 Drawing Sheets

(51) Int. Cl.
*H04W 8/18* (2009.01)
*H04W 4/60* (2018.01)
*H04L 29/06* (2006.01)

(58) Field of Classification Search
CPC ......... H04W 4/70; H04W 40/02; H04W 4/06; H04W 4/20; H04W 8/18; H04W 12/06; H04W 24/08
USPC ............................... 370/235, 241, 250, 328
See application file for complete search history.

(56) References Cited

U.S. PATENT DOCUMENTS

| | | |
|---|---|---|
| 7,215,637 B1 | 5/2007 | Ferguson et al. |
| 7,385,924 B1 | 6/2008 | Riddle |
| 7,733,891 B2 | 6/2010 | Reynolds et al. |
| 7,865,944 B1 | 1/2011 | Shu et al. |
| 7,911,975 B2 | 3/2011 | Droz et al. |
| 8,018,955 B2 | 9/2011 | Agarwal et al. |
| 8,583,109 B2 | 11/2013 | Gillot et al. |
| 8,929,356 B2 | 1/2015 | Pandey et al. |
| 9,130,818 B2 | 9/2015 | Hilton et al. |
| 9,380,002 B2 | 6/2016 | Johansson et al. |
| 10,057,126 B2 | 8/2018 | Vedam et al. |
| 10,230,667 B2 | 3/2019 | Johansson et al. |
| 10,404,597 B2 | 9/2019 | Bakshi |
| 2007/0217425 A1 | 9/2007 | Claise et al. |
| 2009/0129271 A1 | 5/2009 | Ramankutty et al. |
| 2010/0226282 A1 | 9/2010 | Aitken et al. |
| 2011/0075557 A1 | 3/2011 | Chowdhury et al. |
| 2013/0097329 A1 | 4/2013 | Alex et al. |
| 2014/0304393 A1 | 10/2014 | Annamalaisami et al. |
| 2014/0321278 A1* | 10/2014 | Cafarelli ............. H04L 47/2441 370/235 |
| 2017/0230832 A1* | 8/2017 | Ophir .................... H04W 12/06 |
| 2019/0098522 A1* | 3/2019 | Tenea ..................... H04L 43/12 |

OTHER PUBLICATIONS

Gigamon, "GTP Correlation", Feature Brief, 4 pgs. (2016).
Wikipedia, "MurmurHash", 2 pgs. (2011).
Gigamon, "FlowVUE Application" Feature Brief, 3 pgs. (2016).
Gigamon, "Subscriber-Aware Visibility", Application Note, 21 pgs. (2016).
Trammell et al., "Applying IPFIX to Network Measurement and Management", IETF, 77 pgs. (Jul. 2013).
Hofstede et al., "Flow Monitoring Explained: From Packet Capture to Data Analysis With NetFlow and IPFIX", IEEE, 31 pgs. (May 2014).
"Ixia GTP Session Controller 7433," Ixia Data Sheet, 915-6606-01-2161 Rev D, www.ixiacom.com, pp. 1-6 (Aug. 2017).
"Application Note: Subscriber-Aware Visibility—Rethinking Operator Infrastructure Monitoring," Gigamon 4092-01, pp. 1-21 (Nov. 2016).
Bhardwaj, "Technology Primer on "Understanding the Different Aspects of LTE and Its Impact in Various Areas"," Accessed from wayback machine https://web.archive.org/web/20160620183436/ https://www.syniverse.com/assets/files/custom_content/understanding-different-aspects-lte.pdf, pp. 1-32 (Jun. 20, 2016).
Suthar, "Designing LTE with IPv6," Cisco Systems Inc., pp. 1-34 (2010).

* cited by examiner

SUBSCRIBER SAMPLING FOR NETWORK PACKET FORWARDING BASED UPON UNIQUE SUBSCRIBER IDENTIFIERS

RELATED APPLICATIONS

This application claims priority under 35 USC § 119 to Romanian Patent Application No. a 2018 00011 filed on Jan. 12, 2018, and entitled "SUBSCRIBER SAMPLING FOR NETWORK PACKET FORWARDING BASED UPON UNIQUE SUBSCRIBER IDENTIFIERS," which application is hereby incorporated by reference in its entirety.

TECHNICAL FIELD

This invention relates to subscriber packet forwarding for network packet communication systems and, more particularly, to forwarding packets for mobile network systems that use GTP (GPRS (General Packet Radio Service) Tunneling Protocol) packets.

BACKGROUND

For certain communication systems, network packets are communicated within network sessions between two or more network nodes. One protocol that is used for network sessions is GTP (GPRS (General Packet Radio Service) Tunneling Protocol). User equipment (UE), such as mobile cellular handsets, can have multiple active sessions at a time that are using GTP communications. To manage these GTP communication sessions, it is often desirable to have visibility into all sessions that are active for a particular UE as a subscriber within the network. As such, network monitoring tools often desire to receive all network packets associated with the active GTP sessions for a particular subscriber. Tracking these active sessions, however, is difficult because sessions are constantly being created and torn down within the network communication system.

Mobile subscribers within a mobile communication network are often identified by a unique subscriber identifier such as their IMSI (International Mobile Subscriber Identity), which is a unique digital value stored by the mobile unit (e.g., cellular telephone in a SIM (Subscriber Identification Module) card or other storage medium), their MSISDN (Mobile Subscriber International Subscriber Directory Number) identifier, their phone number, a call identifier, and/or other unique identifier corresponding to the subscriber or caller within the network. The IMSI or other unique subscriber identifier is often communicated by the mobile unit to the communication network (e.g., to cellular base stations). Where GTP packets are used, the GTP packets are often classified in part by their TEID (tunnel endpoint identifier) that associates the GTP packet with a subscriber session and related GTP tunnel. GTP session controllers (GSC) have been used in the past to identify and track user sessions and related TEIDs so that all packets associated with a subscriber session can be forwarded to a common network monitoring tool. To achieve this result, a GSC typically receives and analyzes control packets (GTP-C) associated with subscriber traffic to track changes to sessions and to map TEIDs to their particular subscriber sessions.

Mobile core networks (e.g., latest generations often called Evolved Packet Cores or EPC networks) provide seamless transfer of data to subscribers as they move around the network, from one cell tower (e.g., eNodeB) to another. For certain mobile networks such as 3GPP (3$^{rd}$ Generation Partnership Project) networks, a session is created for the subscriber when the subscriber attaches to the network, and the session effectively builds a data plane connection with the data being encapsulated using tunnels (e.g., GTP tunnels). These tunnels can use various tunnel identifiers (e.g., TEIDs) along the communication path that are associated with the temporary subscriber sessions that are created and then torn down, and these tunnel identifiers are maintained by a control plane connection between the nodes.

As traffic volumes increase within a network, it becomes practically impossible for quality of service (QoS) and/or other network metrics or security to be monitored by a single network probe or monitoring tool. As such, multiple network monitoring tools are often used. Traditional load balancing mechanisms, however, do not work well as traffic for one user often ends up on multiple monitoring tools. The monitoring tools are then required to spend valuable resources correlating user data. To resolve this problem, network taps or collections points can be used to feed the GTP traffic to network packet brokers and/or GSCs that filter and forward the GTP traffic to network monitoring tools based upon tracked user sessions. For example, a session table can be built that associates each session to its GTP tunnels and then forwards subscriber traffic to a single monitoring tool based upon those tracked sessions. In another example, for VoLTE (Voice over Long-Term Evolution) calls, a session table can be built by associating the caller and callee to the tunnels represented by the combination of IP (internet protocol) addresses and UDP (User Datagram Protocol) ports that are used for RTP (Real Time Protocol) along the VoLTE call path within the network.

This session table tracking for subscriber flows, however, can degrade due to latencies when subscriber packets are being detected at multiple monitoring interfaces associated with a GSC and/or are being received by independent GSCs in distinct network locations. Further, it is often desirable to sample all network traffic across all monitored links for a subset of selected subscribers. When a particular subscriber or subset of subscribers is selected for sampling, it can be difficult to effectively communicate this sampling selection information to other monitoring processes in the GSC and/or to other GSCs in the network where session based tracking is being used. Further, where common session tables and/or copies of session tables are used within a GSC and/or shared across multiple GSCs, concurrent memory access contention issues can arise as well as update latency and scaling issues.

SUMMARY

Systems and methods are disclosed for subscriber sampling for network packet forwarding based upon unique subscriber identifiers. Various features and embodiments can be implemented, and related systems and methods can be utilized, as well.

For one embodiment, a method to sample packets for network packet forwarding is disclosed including receiving input packets associated with subscribers within a network where the input packets include control packets and user packets. For the control packets, the method further includes, processing the control packets to identify unique subscriber identifiers and to detect session identifiers related to the unique subscriber identifiers and, for each unique subscriber identifier, storing the unique subscriber identifier and its related session identifiers within a tracking table. For each input packet, the method further includes analyzing contents of the input packet to extract a session identifier and a unique subscriber identifier if present within the input packet and, when a unique subscriber identifier is not present, accessing the tracking table to determine a unique subscriber identifier associated with the session identifier extracted from the packet. For each input packet, the method further includes sampling the input packet based upon the unique subscriber or call identifier to determine whether or not to output the input packet as a sampled packet and, when output by the sampling, forwarding the sampled packet to one or more egress ports.

In additional embodiments, the sampling includes applying a hash function to the unique subscriber identifier for that input packet to generate a hash value and comparing the hash value to sampling parameters to determine whether or not to output the input packet as a sampled packet. In further embodiments, the method also includes modifying the sampling parameters over time to adjust a selection of subscribers to sample. In still further embodiments, the forwarding includes forwarding the sampled packet based upon the hash value, and the forwarding is configured to send all input packets having a same hash value to at least one common egress port.

In additional embodiments, the sampling includes applying a dynamic function to the unique subscriber identifier to determine whether or not to output the input packet as a sampled packet, and the dynamic function is configured to change over time to adjust a selection of subscribers to sample. In further embodiments, the applying includes generating a result value based upon the dynamic function and comparing the result value to sampling parameters to determine whether or not to output the input packet as a sampled packet.

In additional embodiments, each unique subscriber identifier includes an IMSI configured to uniquely identify a subscriber for the network; each of the session identifiers includes a TEID (tunnel endpoint identifier) configured to identify a tunnel generated for a session associated with a subscriber for the network; the input packets are GTP (GPRS (General Packet Radio Service) Tunneling Protocol) packets; the control packets are GTP-C packets; and the user packets are GTP-U packets. In further embodiments, each call identifier includes a pair of MSISDNs to identify a call for the network, and each of the session identifiers includes IP addresses and UDP ports to identify a tunnel generated for a session associated with an RTP call for the network. In still further embodiments, each unique subscriber identifier includes an IMSI identifier or an MSISDNS identifier configured to uniquely identify a subscriber or a call in the network; wherein each of the session identifiers comprises a TEID or a pair of an IP address and a UDP port configured to identify a tunnel generated for a session associated with a subscriber or a call the network; and wherein the input packets are GTP packets or SIP (Session Initiation Protocol) packets and RTP packets.

In additional embodiments, the method also includes always forwarding an input packet to one or more egress ports where the subscriber identifier for the input packet is associated with a whitelist identifying packets to always forward. In further embodiments, the input packets are received by a plurality of ingress ports, and the processing, storing, analyzing, and accessing are performed at each of the plurality of ingress ports. In still further embodiments, the tracking table is a common tracking table used by two or more of the plurality of ingress ports.

In additional embodiments, the receiving, processing, storing, analyzing, accessing, sampling, and forwarding are performed at a plurality of packet forwarding systems. In further embodiments, the method also includes receiving at each of the packet forwarding systems configuration information and using the configuration information to determine sampling parameters for the sampling. In still further embodiments, the sampling parameters are configured to cause input packets associated with a selected percentage of hash values to be forwarded as sampled packets.

For one embodiment, a system to sample packets for network packet forwarding is disclosed including ingress ports configured to receive input packets associated with subscribers within a network where the input packets include control packets and user packets. The system also includes one or more programmable integrated circuits including at least one of a processor or a programmable logic device programmed, for the control packets, to process the control packets in order to identify unique subscriber identifiers and to identify session identifiers related to the unique subscriber identifiers and, for each unique subscriber identifier, store the unique subscriber identifier and its related session identifiers within a tracking table. The one or more programmable integrated circuits are further programmed to, for the input packets, extract unique subscriber identifiers and session identifiers if present within the input packets and, for input packets where unique subscriber identifiers are not present and one or more session identifiers are present, access the tracking table to determine a unique subscriber identifier associated with the one or more session identifiers. The system further includes a sampler associated with each ingress port and a filter associated with each sampler. Each sampler is configured, for each input packet, to sample the input packet based upon the unique subscriber identifier to determine whether or not to output the input packet as a sampled packet. Each filter is configured to forward each sampled packet output by that sampler to one or more egress ports.

In additional embodiments, the sampler is further configured to apply a hash function to the unique subscriber identifier for that input packet to generate a hash value and compare the hash value to sampling parameters to determine whether or not to output the input packet as a sampled packet. In further embodiments, the sampler is further configured to apply a dynamic function to the unique subscriber identifier to determine whether or not to output the input packet as a sampled packet, and the dynamic function is configured to change over time to adjust a selection of subscribers to sample.

In additional embodiments, each unique subscriber identifier includes an IMSI configured to uniquely identify a subscriber for the network; each of the session identifiers includes a TEID configured to identify a tunnel generated for a session associated with a subscriber for the network; the input packets are GTP packets; the control packets are GTP-C packets; and the user packets are GTP-U packets. In further embodiments, each call identifier includes a pair of MSISDNs to identify a call for the network, and each of the session identifiers includes IP addresses and UDP ports to identify a tunnel generated for a session associated with an RTP call for the network. In still further embodiments, each unique subscriber identifier includes an IMSI identifier or an MSISDNS identifier configured to uniquely identify a subscriber or a call in the network; wherein each of the session identifiers comprises a TEID or a pair of an IP address and a UDP port configured to identify a tunnel generated for a session associated with a subscriber or a call the network; and wherein the input packets are GTP packets or SIP packets and RTP packets.

In additional embodiments, the sampler is further configured to always identify an input packet as a sampled packet where the subscriber identifier for the input packet is associated with a whitelist configured to identify packets always to be forward.

In additional embodiments, the tracking table is a common tracking table configured to be used by two or more of the ingress ports. In further additional embodiments, each sampler is further configured to apply sampling parameters to cause input packets associated within a selected percentage to be forwarded to one or more egress ports.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION

Systems and methods are disclosed for subscriber sampling for network packet forwarding based upon unique subscriber identifiers. Different features and variations can be implemented, as desired, and related systems and methods can be utilized, as well.

Embodiments described herein provide high-speed selective sampling of subscribers that does not suffer from the latency and data integrity problems described above with respect to the session table based approaches. In part, the disclosed embodiments provide a subscriber sampling capability that dynamically selects a set of subscribers for sampling based upon unique subscriber identifiers and can provide correlation of their traffic across all monitored network interfaces/links including across multiple different packet forwarding systems. As described herein, packets with common unique subscriber identifiers that have been selected for sampling are forwarded to one or more common egress ports so that one or more common monitoring tools will receive traffic for that common unique subscriber identifier. As indicated above, unique subscriber identifiers can include, for example, IMSI (International Mobile Subscriber Identity) identifiers, MSISDNs (Mobile Subscriber International Subscriber Directory Number), phone numbers, call identifiers, and/or other unique identifiers corresponding to subscribers and/or callers within a communication network. For certain embodiments, hash functions are applied to the unique subscriber identifiers in order to generate hash values that are used to provide the sampling selection. For additional embodiments, dynamic functions are applied to the unique subscriber identifiers to determine whether or not input packets are sampled a forwarded to egress ports. As such, subscriber-based sampling is provided through an indirect mechanism of applying one or more functions to the subscriber identifier (e.g., IMSI or MSISDSN) and then using the results of these function(s) to control which subscriber packets are forwarded on for further processing and which subscriber packets are not forwarded. Non-forwarded subscriber packets can be sent to a discard port and/or dropped. Other variations can also be implemented while still taking advantage of the subscriber sampling described herein.

Where the network uses GTP (GPRS (General Packet Radio Service) Tunneling Protocol) packets, the embodiments described herein extract tunnel endpoint identifiers (TEIDs) associated with GTP tunnels set up for subscriber sessions as well as IMSI identifiers for these subscribers from control packets (GTP-C) and user packets (GTP-U) for the GTP communications. The TEIDs are used for packets not containing an IMSI to determine the IMSI for that packet. The IMSIs are then used for the subscriber sampling, such as the hash-based sampling and/or the dynamic function-based sampling, described herein to select and forward subscriber packets for further processing.

Figure 1:
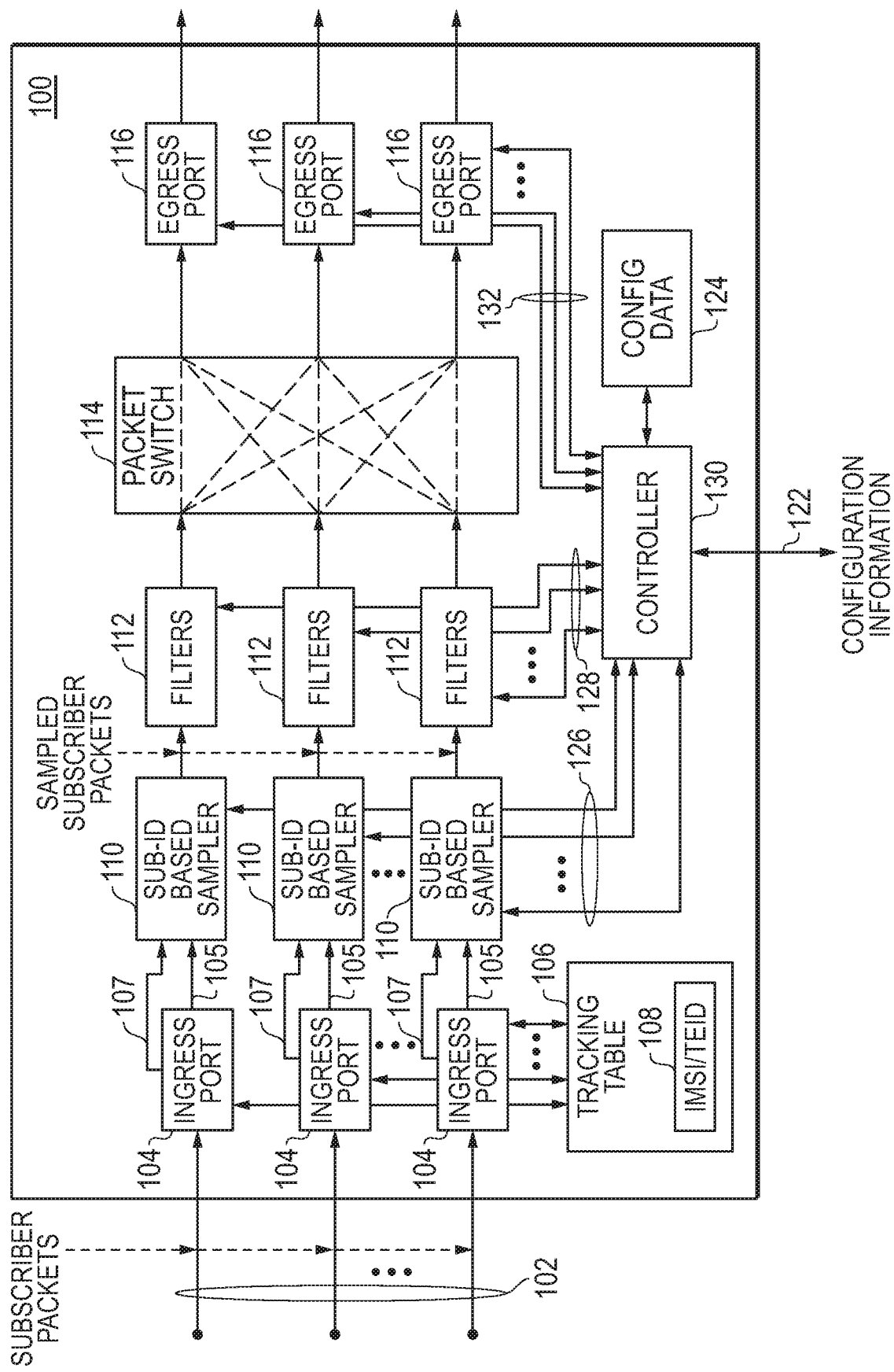
FIG. 1 is a block diagram of an example embodiment for a packet forwarding system that uses sampling based upon unique subscriber identifiers to provide subscriber sampling for packet forwarding with respect to monitored network packets.

FIG. 1 is a block diagram of an example embodiment for a packet forwarding system 100 that uses sampling based upon unique subscriber identifiers (e.g., IMSIs) to provide subscriber sampling for monitored network packets. The packet forwarding system 100 receives subscriber packets (SUB PKTS) through network packets captured at various network nodes and sent to ingress ports 104. These input packets 102 are analyzed at the ingress ports 104 to extract unique subscriber identifiers (e.g., IMSIs) and session identifiers (e.g., TEIDs) from the input packets 102, which include control packets (e.g., GTP-C packets) and user packets (e.g., GTP-U packets). Sessions for subscribers are also tracked at the ingress ports 104 so that session identifiers can be associated with the unique subscriber identifier for a particular subscriber. The subscriber identifiers and the correlated session identifiers are then stored in records 108 within the tracking table 106. For a mobile network using GTP packets, a mobile unit subscriber will send its IMSI in packets communicated during initial session creation; however, subsequent packets may only include TEIDs set up for session tunnels for that mobile unit subscriber. The tracking table 106 allows for IMSI identifiers to be determined for TEIDs extracted from incoming packets 102 even where a particular packet does not include the IMSI identifier but only includes TEID information. It is noted that a processor and/or other programmable integrated circuit can be associated with each ingress port 104 and programmed to provide the processing of each input packet as it is received by that the ingress port 104.

It is noted that a record 108 can be created in the tracking table 106 for each new unique subscriber identifier (e.g., IMSI) detected within the input packets 102. For example, received control packets (e.g., GTP-C packets) can be analyzed to detect new subscriber identifiers (e.g., IMSIs). Again looking to GTP packets as an example, any TEIDs detected for a particular IMSI can also be stored within the record 108 that IMSI. For example, received GTP-C packets can be analyzed to detect new TEIDs that are associated with an IMSI. As such, each of the records 108 will include a unique IMSI and will include TEIDs associated with that unique IMSI. Other techniques could also be used to store unique subscriber identifiers (e.g., IMSIs) and related session identifiers (e.g., TEIDs) while still taking advantage of the subscriber sampling described herein.

For each incoming packet 102, each of the ingress ports 104 forwards the packet 105 and its unique subscriber identifier 107 to a sampler 110. For each received input packet 102, the sampler 110 applies a hash function, a dynamic function, and/or another selected function to the unique subscriber identifier 107 to determine whether or not to forward the packet as a sampled subscriber packet. Where a hash function is applied, the hash function includes one or more hash algorithms that are applied to the unique subscriber identifier to generate a hash value. This subscriber-based hash value is then used for sampling and determines whether the packet is forwarded as a sampled subscriber packet for further processing. As such, based upon the sampling provided by the samplers 110, the filters 112 receive sampled subscriber packets that are a subset of the input packets 102 received at the ingress ports 104.

With respect to dynamic functions, one or more time-varying mathematical algorithms are applied to the subscriber identifier 107 for each input packet 102 to determine whether or not to forward that input packet 102 as a sampled subscriber packet. For certain embodiments, the dynamic function can also generate a result value that is compared to sampling parameters to determine whether not the input packet is forwarded. Further, the dynamic function can be a time-varying function of the unique subscriber identifier 107 such that the result value changes over time to adjust the subscribers being sampled. For example, where the dynamic function is configured to apply a sampling percentage to the input packets such that only a percentage of subscribers have their packets forwarded at any given time, the dynamic function can be modified after each time period (t) such that a different subset of subscribers are selected in each time period. In this way, the dynamic function can be dynamically adjust the sampling percentage over time across the universe of subscribers thereby achieving fair and evenly distributed sampling of the universe of subscribers. One example of a dynamic function is to generate result values between a minimum value and a maximum value using a hash function applied to the unique subscriber identifiers, and then to adjust over time a subset of values between the minimum and maximum values for which packets are forwarded such that all values are covered evenly over some time window including multiple adjustment time periods (t). Other variations and sampling functions can also be applied while still taking advantage of the subscriber sampling techniques described herein.

The filters 112 determine how the sampled packets received from the samplers 110 are forwarded through the packet switch 114 to one or more egress ports 116. Preferably, packets having the same unique subscriber identifier, hash value, and/or result value are forwarded to one or more common egress ports. Because the hash values and result values are based upon the unique subscriber identifiers, it is expected that all input packets from a subscriber selected for sampling will be received by a common egress port. As described herein, the unique subscriber identifiers are either extracted directly from the input packets 102 or determined from the tracking table 106 based upon the session identifiers extracted from the input packets 102.

A controller 130 in part communicates with the samplers 110 and the filters 112 to provide configuration settings 126/128 that are used to determine one or more sampling parameters for the sampling and forwarding of input packets 102. For one embodiment, the configuration settings 126/128 are based upon configuration information 122 communicated to the packet forwarding system 100 from an external source, such as an external controller, and stored as configuration data 124 within a data storage system for the packet forwarding system 100. As such, configuration information 122 effectively defines which mobile subscribers will have their packets sampled and forwarded out egress ports for further processing. For one further embodiment, the configuration information 122 is updated dynamically to adjust sampled traffic volumes, to adjust egress port assignments, and/or to adjust other operating parameters.

It is further noted that the controller 130 can also be coupled to receive feedback messages 132 from the egress ports 116 that provide operational parameters associated with the egress ports 116. For example, egress port utilization parameters can be communicated as feedback messages 132 from the egress ports 116 to the controller 130, and these utilization parameters can indicate when the egress ports 116 are oversubscribed and/or overloaded with sampled subscriber packets. The controller 130 can then adjust the configuration settings 126/128 to adjust the sampling percentage and/or sampling rate provided by the samplers 110 to address the oversubscribed or overloaded condition of the egress ports 116 so that the one or more egress ports 116 are no longer oversubscribed or overloaded. The controller 130 can also be coupled to communication control messages or signals with the ingress ports 104, the packet switch 114, and/or other components within the packet forwarding system 100.

In one example embodiment for packet forwarding system 100 where GTP packet communications are used, a GTP-C packet is received at an ingress port 104. A processor and/or other programmable integrated circuit associated with that ingress port 104 parses the GTP-C packet and extracts an IMSI value associated with a mobile subscriber. In addition, a TEID value associated with the mobile subscriber is also extracted from the GTP-C packet and/or from additional GTP-C packets received at ingress port 104. The IMSI and TEID values are associated and included within a binding record 108 that is created and stored in the tracking table 106. This tracking table 106 is accessible to one, some, or all of the ingress ports 104 in the packet forwarding system 100. The IMSI is also provided as the subscriber identifier 107 to the samplers 110.

In one embodiment, all of the samplers 110 implement the same hash function or dynamic function to provide consistency in the sampling selection of subscribers. In one further embodiment, a hash function applied by the samplers 110 is configured to output an integer number between 1 and 100 based upon the input IMSI value. The resulting hash values from the hash function are evaluated and used as the basis for determining whether packets are forwarded for further processing or dropped. Because the hash values are based upon the IMSI and the IMSI is unique to a subscriber, the samplers 110 effectively select which mobile subscribers have their packets sampled and forwarded to one or more network monitoring tools.

The filters 112 effectively map the unique subscriber identifiers to egress ports 116 and can be configured to use hash values, result values, and/or other subscriber-based information to forward the sampled subscriber packets to the egress ports 116. In this way, the unique subscriber identifiers are for the sampled subscriber packets are effectively used to map each input packet to one or more egress ports 116. In some embodiments, each egress port is associated with a network monitoring tool. The input packets 102 that are not included in the sampling set of sampled subscriber packets are mapped to a discard port or collector port where these packets can be aggregated and passed to some other destination. The non-selected packets can also be dropped if no further processing of these non-selected packets is desired. Other variations can also be implemented while still taking advantage of the subscriber sampling techniques described herein.

For one embodiment, a range of hash values may be designated to indicate inclusion in the subscriber sampling set. For example, wherein hash values of 1 to 100 are generated by the hash function applied by the samplers 110, one or more ranges of numbers within the values of 1 to 100 can be used to determine which subscriber packets are sampled for further processing. For one embodiment, the hash values are used to determine a percentage of the input packets 102 that are sampled and forwarded for further processing as sampled subscriber packets. For example, hash output values from 1 to 25 within a total range of 1 to 100 can be used to designate a sampling set where 25 percent of the subscribers have their packets sampled and forwarded for further processing. For this example, those unique subscriber identifiers that generate hash values in the range of 1 to 25 are selected for sampling, and related packets are forwarded to an egress port and output to a network monitoring tool for further processing.

For the disclosed embodiments that apply hash functions, uniformly distributed hash values are preferably generated using the hash functions that are applied to the unique subscriber identifiers such as IMSI identifiers. The hash function applies one or more hash algorithms that will produce the same hash value for any particular value for a unique subscriber identifier (ID). For example, the hash function can generate hash values between zero and a maximum value (e.g., 0≤HASH_VALUE≤MAX_VALUE). The hash value can then be used to determine if the subscriber packets will be sampled and forwarded for further processing. For one example embodiment, a hash value will be sampled if the hash value is less than or equal to a sampling percentage applied to the maximum value for the hash function (e.g., HASH_VALUE≤SAMPLING_PERCENTAGE*MAX_VALUE_SIZE). Because a particular unique subscriber identifier (e.g., IMSI) will always have the same hash value as generated by the hash function, the disclosed embodiments guarantee that the packets from the selected subscribers will be tracked regardless of the ingress port 104 and/or the particular packet forwarding system 100 (where multiple packet forwarding systems 100 are used) that receives the packets for that subscriber. Thus, comprehensive subscriber statistics can still be collected for a particular mobile subscriber even as they roam around a mobile network creating and dropping various user sessions.

It is further noted that for a particular high-value subscriber of interest, the unique subscriber identifier (e.g. IMSI or MSISDN) and/or its hash value can be added to a special whitelist and can be checked before applying the subscriber sampling. If the unique subscriber identifier for an input packet is on this special whitelist, the input packet will be forwarded on for further processing by the packet forwarding system 100 essentially bypassing the operation of the samplers 110. It is noted that the configuration information 122 can include whitelist information that identifies packets to always forward based upon unique subscriber identifiers, and this whitelist information can be forwarded as part of the configuration settings 126/128 to the samplers 110 and filter 112. In addition to sampling subscriber traffic using IMSIs, bi-directional calls can also be sampled, for example, based on unique subscriber identifiers that include a pair of MSISDNs to identify callers for calls within the communication network. The session identifiers can include, for example, IP addresses and UDP ports that identify a tunnel generated for a session associated with an RTP call for the network. Calls can also be excluded from sampling if one of the MSISDNs is on a whitelist. For further embodiments, each call identifier includes a pair of MSISDNs to identify a call for the network, and each of the session identifiers includes IP addresses and UDP ports to identify a tunnel generated for a session associated with an RTP call for the network. In still further embodiments, each unique subscriber identifier includes an IMSI identifier or an MSISDNS identifier configured to uniquely identify a subscriber or a call in the network; wherein each of the session identifiers comprises a TEID or a pair of an IP address and a UDP port configured to identify a tunnel generated for a session associated with a subscriber or a call the network; and wherein the input packets are GTP packets or SIP (Session Initiation Protocol) packets and RTP packets. Other variations can also be implemented while still taking advantage of the techniques described herein.

Figure 2:
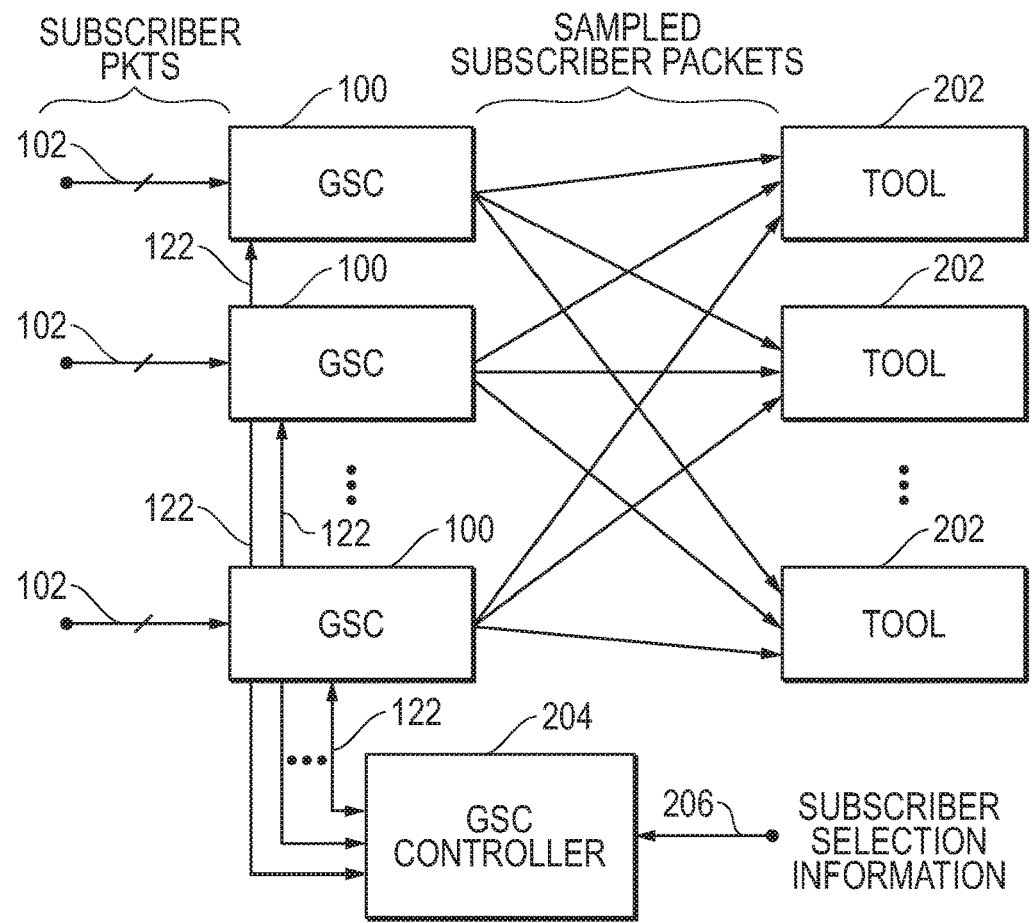
FIG. 2 is a block diagram of an example embodiment for a monitoring system that includes multiple GTP (GPRS (General Packet Radio Service) Tunneling Protocol) session controllers that are operating as packet forwarding systems to provide sampled packets to network monitoring tools.

FIG. 2 is a block diagram of an example embodiment for a monitoring system 200 that includes multiple GSCs that are operating as packet forwarding systems 100 to provide sampled subscriber packets to network monitoring tools 202. The GSC controller 204 communicates with the GSCs 100 to provide the sampling configuration information 122 based upon subscriber selection information 206. The subscriber selection information 206 can be based upon a variety of factors including packet monitoring desired by network administrators, network threats detected by network monitoring systems, and/or other factors. During operation, subscriber packets are received as input packets 102 by the GSCs 100, and these input packets 102 are processed as described above with respect to packet forward system 100. The monitoring tools 202 receive sampled subscriber packets from the GSCs 100 based upon the sampling configuration information 122. As described herein, all subscriber packets for any particular unique subscriber ID (e.g., IMSI) being monitored are preferably forwarded to one or more common monitoring tools within the monitoring tools 202, and the operation of the samplers 110 and the filters 112 within the GSCs 100 provide this result by basing the sampling/forwarding of subscriber packets on hash values or other values generated from the unique subscriber identifiers (e.g., IMSI) for received packets 102.

Figure 3:
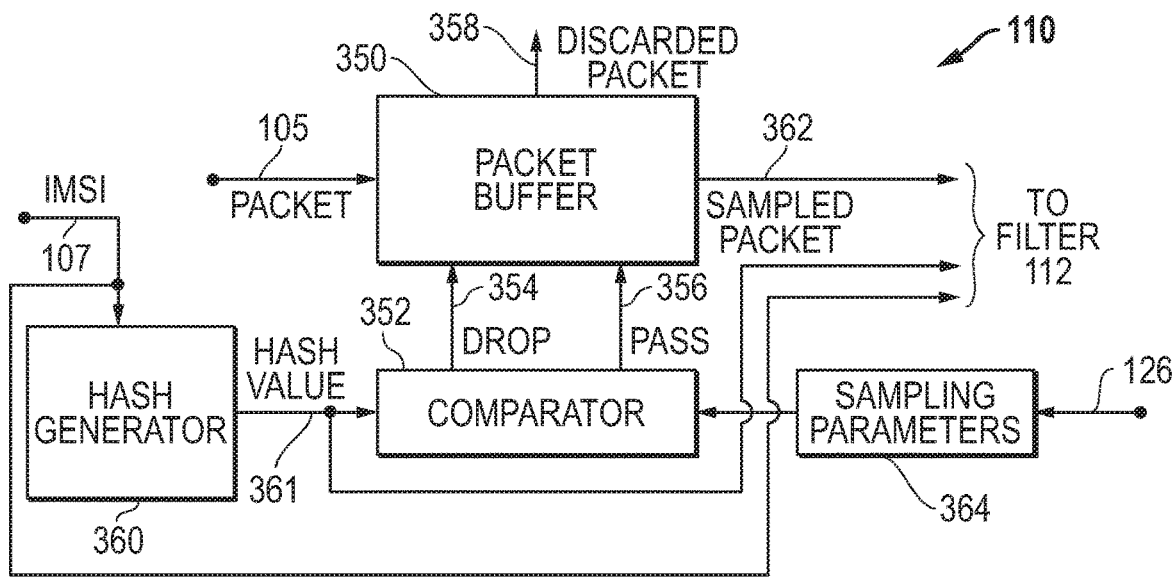
FIG. 3 is a block diagram of an example embodiment for a sampler that uses unique subscriber identifiers and hash-based sampling to provide subscriber sampling.

FIG. 3 is a block diagram of an example embodiment for a sampler 110 that uses a unique subscriber identifier 107 and hash-based sampling to provide subscriber sampling. For this example embodiment, a hash generator 360 receives the unique subscriber identifier (e.g. IMSI) 107 and generates a hash value 361. A comparator 352 compares the hash value 361 to one or more sampling parameters 364 that are based upon configuration settings 126. Based upon this comparison, the comparator 352 generates a drop signal 354 or a pass signal 356 that are communicated to a packet buffer 350. The packet buffer 350 receives the input packet 105 and forwards the input packet 105 as a sampled subscriber packet 362 to a filter 112 if a pass signal 356 is received for that input packet 105. In addition to the sampled subscriber packet 362, the hash value 361 as well as the unique subscriber identifier 107 can also be communicated to the filter 112 for use in forwarding the sampled subscriber packet 362 to one or more of the egress ports 116. If a drop signal 354 is instead output by the comparator 352 and received by the packet buffer 350 for the input packet 105, the input packet 105 is output as a discarded packet 358. It is noted that that the discarded packets 358 can also be forwarded to discard port, collection port, and/or other network destination if further analysis of non-sampled packets is desired. The discarded packet 358 can also be dropped if not further processing is desired. Other variations could also be implemented while still taking advantage of the subscriber sampling described herein.

It is noted that the hash generator 360 can be implemented as a single hash generator or can be implemented as multiple hash generators. The hash generator 360 can also be configured to generate hash values 361 based upon a hash function including one or more hash algorithms that are applied to the unique subscriber identifier 107. The hash generator 360 is preferably configured to apply a hash function having uniform distribution characteristics such that resulting hash values are generated with even distributions across a range of possible hash values. Further, it is desirable that the hash function generates different hash values for data strings that are different but similar so that similar but different data strings can be distinguished. Other considerations can also be used to select the hash algorithm(s) used by for the hash function by the hash generator 360. It is further noted that SHA-1, MD5, FNV (Fowler-Noll-Vo), and MurmurHash are known algorithms for generating hash values based upon selected input parameters. It is further noted that large cryptographic hash algorithms, such as MD5, may be difficult to utilize for the embodiments described herein because they tend to be complex and slow algorithms. It is also noted that PRBS (pseudo-random binary sequence), CRC (cyclic redundancy check), and other cyclical polynomial computations (e.g., Reed Solomon) could also be utilized to generate hash values. While these cyclical polynomial computations can be easier to implement in hardware, they typically provide worse performance with respect to desirable hash parameters. Non-cryptographic hash algorithms can also be used to provide hash values. If desired, a non-cryptographic MurmurHash-type hash algorithm can be used and can be split into multiple 16-bit hash processes that execute in parallel followed by a final series of mixing steps. Other variations, hash algorithms, and combinations of hash algorithms can also be implemented while still taking advantage of the subscriber sampling techniques described herein.

It is also noted that the packet forwarding system 100 can be implemented in a variety of difference devices or components within a network communication system including physical and/or virtual processing environments. It is further noted that the packet forwarding systems 100 as well as the samplers 110, the ingress ports 104, the filters 112, the packet switch 114, the controller 130, and the egress ports 116 can be implemented using one or more programmable integrated circuits programmed to perform the operations and functions described herein, and the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). In addition, the packet buffer 350 as well as data storage systems for the configuration data 124 and the sampling parameters 364 can be implemented as one or more data structures stored in any desired non-transitory tangible computer-readable medium including, for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. Other implementations could also be used while still taking advantage of the subscriber sampling described herein.

Figure 4:
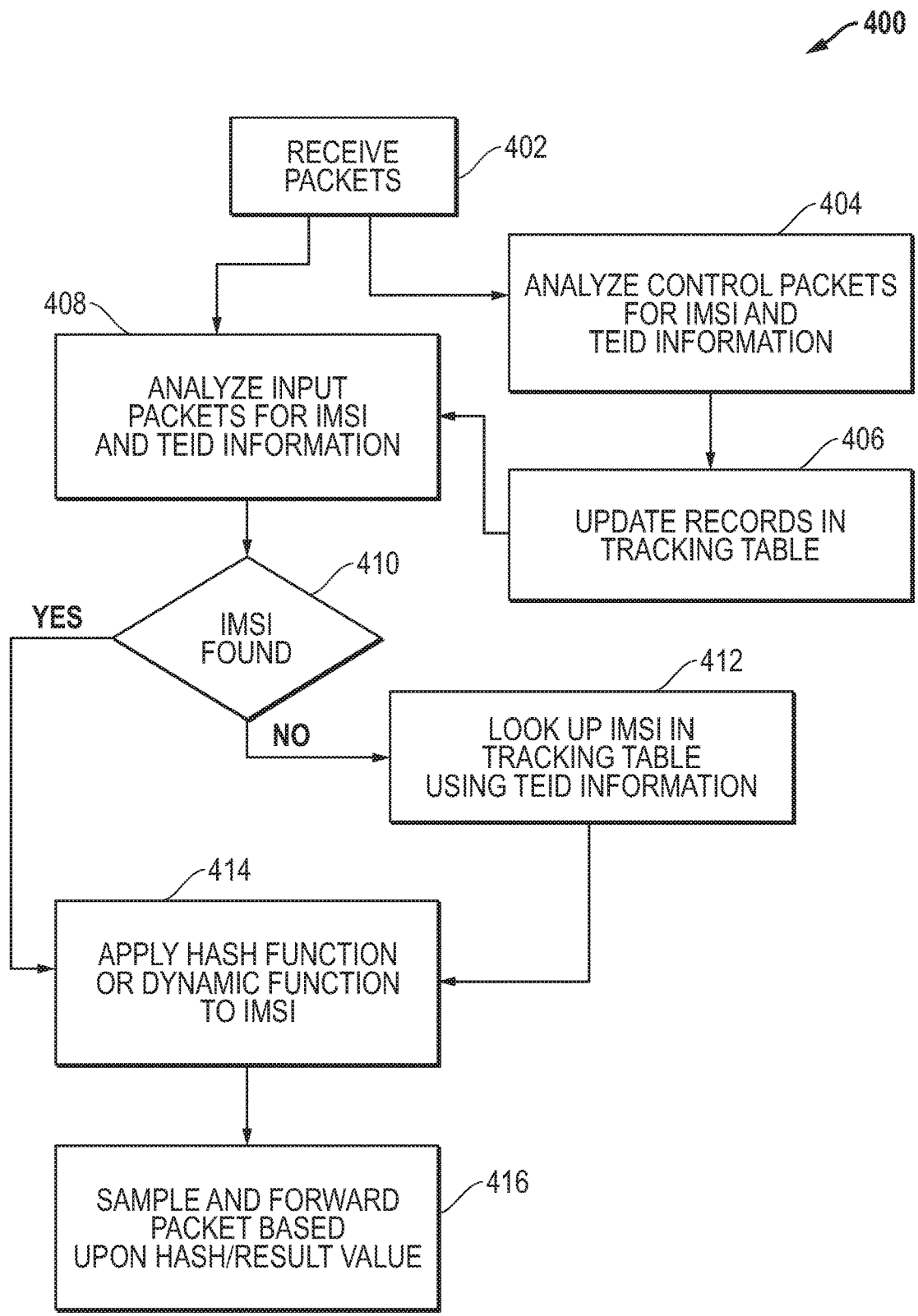
FIG. 4 is a process flow diagram of an example embodiment for applying subscriber sampling to input packets based upon unique subscriber identifiers.

FIG. 4 is a process flow diagram of an example embodiment 400 for applying subscriber-based sampling to input packets 102 using unique subscriber identifiers related to input packets 102. For this example embodiment, it is assumed that unique subscriber identifiers are IMSI identifiers and the session identifiers are TIEDs. In block 402, input packets 102 are received. In block 404, control packets (e.g. GTP-C packets) received as input packets 102 are analyzed for IMSI information and/or TEID information. When located, the IMSI data and TEID data are extracted from the control packets. In block 406, records 108 within a tracking table 106 are created and/or updated based upon the IMSI data and/or the TEID data extracted from the control packets. In block 408, the input packets 102, including user packets and control packets, are analyzed for IMSI and TEID information. Determination block 410 is reached from blocks 406/408 where a determination is made whether an IMSI was found. If "YES," then flow passes directly to block 414. If "NO," then flow passes to block 412 where TEID information detected in the received input packet is used to look up related IMSI data within the tracking table 106. Flow then passes to block 414. In block 414, a hash function or dynamic function is applied to the IMSI, for example, to generate a hash value or result value. In block 416 the received input packet is sampled and forwarded based upon the hash/result value. It is noted that different and/or additional process steps can also be used while still taking advantage of the subscriber sampling techniques described herein.

Figure 5:
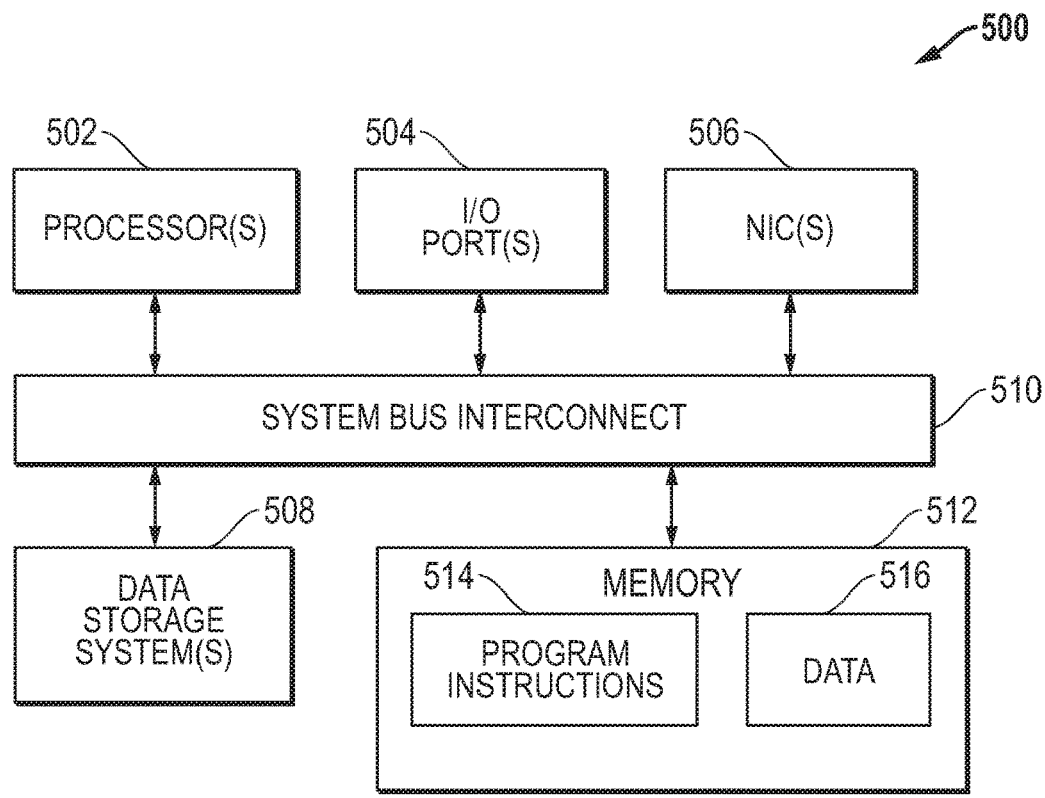
FIG. 5 is a block diagram of an example embodiment for a computing platform that can be used to implement one or more of the components described herein for the packet forwarding system, network monitoring tools, and/or other components of a network communication system.

FIG. 5 is a block diagram of an example embodiment for a computing platform 500 that can be used to implement one or more of the components described herein for the packet forwarding system 100, network monitoring tools 202, and/or other components of a network communication system. The computing platform 500 includes one or more processors 502 or other programmable integrated circuit(s) that are programmed with code or logic instructions to perform the operations and functions described herein. In addition to processors 502 or other programmable integrated circuits, the computing platform 500 can also include one or more input/output (I/O) ports 504, one or more network interface cards (NICs) 506, one or more data storage systems 508, and memory 512 coupled to communicate with each other through a system bus interconnect 510. The memory 512 can include one or more memory devices that store instructions 514 and/or data 516 during operation of the computing platform 500. For example during operation, one or more of the processors 502 or other programmable integrated circuits can load software or program instructions stored in the data storage systems 508 into the memory 512 and then execute the software or program instructions to perform the operations and functions described herein. It is noted that the memory 512 and the data storage system(s) 508 can be implemented using any desired non-transitory tangible computer-readable medium, such as for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing platforms can also be implemented while still taking advantage of the subscriber sampling techniques described herein.

Figure 6:
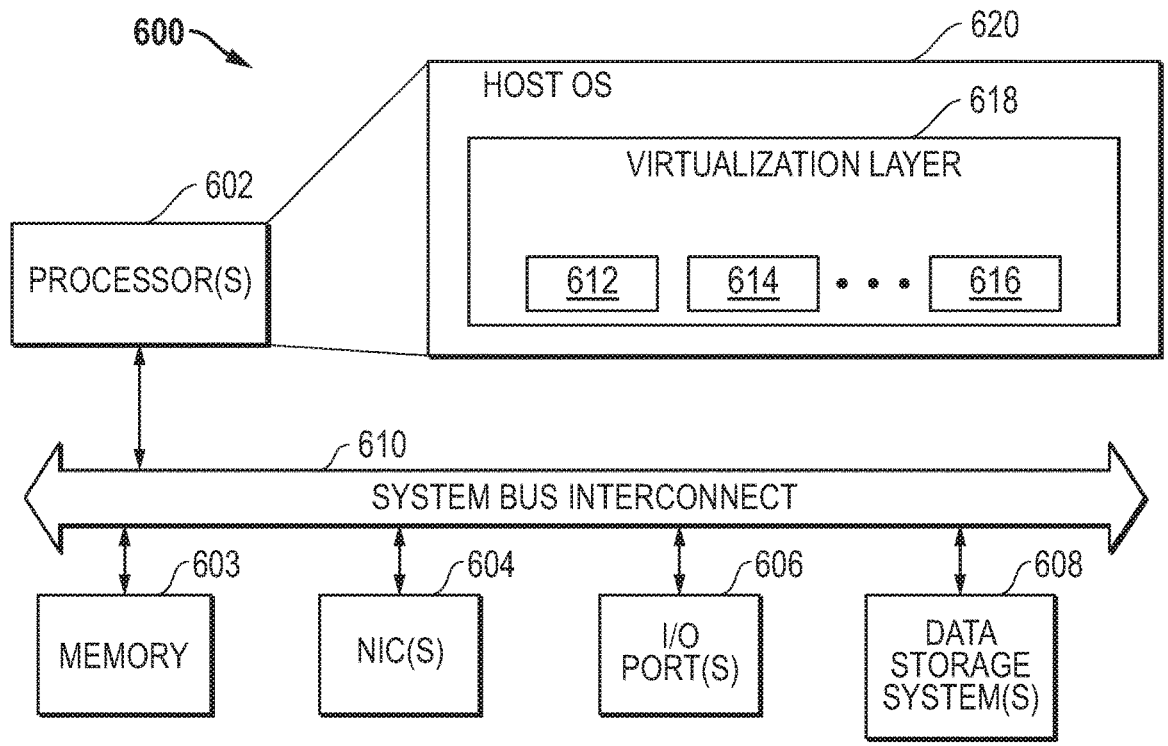
FIG. 6 is a block diagram of an example embodiment for a host server that can provide a virtual processing environment for virtual instances of one or more components described herein for the packet forwarding system, network monitoring tools, and/or other components of a network communication system.

FIG. 6 is a block diagram of an example embodiment 600 for a host server that can provide a virtual processing environment for virtual instances of one or more components described herein for the packet forwarding system 100, network monitoring tools 202, and/or other components of a network communication system. For the example embodiment depicted, the host server 600 includes one or more processors 602 or other programmable integrated circuits that are programmed to provide a virtualization layer 618 for one or more virtual platforms 612, 614, . . . 616 that can implement one or more of the components described herein. The processors 602 or other programmable integrated circuit(s) can be programmed with code or logic instructions stored in the data storage systems 608 to perform the operations and functions described herein. In addition to the processors 602 or other programmable integrated circuits, the host server 600 also includes one or more network interface cards (NICs) 604, one or more input/output (I/O) ports 606, one or more data storage systems 608, and memory 603 coupled to communicate with each other through a system bus interconnect 610. In operation, virtualization layer 618 and the virtual platforms 612, 614, . . . 616 run on top of a host operating system (OS) 620. For example, the host operating system 620, the virtualization layer 618, and the virtual platforms 612, 614, . . . 616 can be initialized, controlled, and operated by the processors or programmable integrated circuits 602 which load and execute software code and/or programming instructions stored in the data storage systems 608 to perform the functions described herein.

It is noted that the memory 603 can include one or more memory devices that store program instructions and/or data used for operation of the host server 600. For example during operation, one or more of the processors 602 or other programmable integrated circuits can load software or program instructions stored in the data storage systems 608 into the memory 603 and then execute the software or program instructions to perform the operations and functions described herein. It is further noted that the data storage system(s) 608 and the memory 603 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the subscriber sampling techniques described herein.

It is further noted that the virtualization layer 618 for the virtual platforms can be implemented using any desired virtualization layer, such as a hypervisor or a container engine, that provides a virtual processing environment for the virtual platforms such as virtual machines (VMs) or application instances. For one embodiment, the container engine can be implemented as a DOCKER container for a Linux operating system configured to execute DOCKER containers, which are software components that are designed to be compatible with a Linux-based DOCKER container engine. Other variations could also be implemented.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the subscriber sampling techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to sample packets for network packet forwarding, comprising:
    at an external controller:
        communicating configuration information to a plurality of packet forward systems, the configuration information identifying subscribers to sample;
    at each of the plurality of packet forwarding systems,
        receiving the configuration information from the external controller;
        receiving control packets and user packets as input packets associated with subscribers within a network;
        identifying unique subscriber identifiers associated with the input packets;
        sampling the input packets by applying a dynamic function to the unique subscriber identifiers to determine which input packets to output as sampled packets, the dynamic function being based upon the configuration information and a hash function applied to the unique subscriber identifiers to generate hash values, and the dynamic function changing over time based upon the configuration information to select different subsets of subscribers to sample in different time periods; and
        when output by the sampling, forwarding the sampled packets to one or more egress ports such that all sampled packets having a same hash value are forwarded to at least one common egress port;
        wherein sampled packets across all of the plurality of packet forwarding systems having the same hash value are forwarded to one or more common monitoring tools based upon the configuration information.

2. The method of claim 1, wherein the sampling comprises comparing the hash values to sampling parameters based upon the configuration information to determine whether or not to output the input packets as a sampled packets.

3. The method of claim 2, further comprising modifying the sampling parameters over time to adjust a selection of subscribers to sample such that sampling of the subscribers is evenly distributed over time.

4. The method of claim 1, wherein the hash values are generated between a minimum value and a maximum value using the hash function, and wherein a subset of values between the minimum value and the maximum value determines which input packets are output as sampled packets.

5. The method of claim 4, wherein the subset of values is adjusted over time based upon the configuration information such that all values are covered evenly over a time window including multiple adjustment time periods.

6. The method of claim 1, wherein the identifying comprises:
    for the control packets,
        processing the control packets to identify unique subscriber identifiers and to identify session identifiers related to the unique subscriber identifiers; and
        for each unique subscriber identifier, storing the unique subscriber identifier and its related session identifiers within a tracking table; and
    for each input packet whether a control packet or a user packet,
        analyzing contents of the input packet to extract a session identifier and a unique subscriber identifier if present within the input packet; and
        when a unique subscriber identifier is not present, accessing the tracking table to determine a unique subscriber identifier associated with the session identifier extracted from the input packet.

7. The method of claim 1, wherein each unique subscriber identifier comprises an IMSI (International Mobile Subscriber Identity) identifier or an MSISDNS (Mobile Subscriber International Subscriber Directory Number) identifier configured to uniquely identify a subscriber or a call in the network; wherein each of the session identifiers comprises a TEID (tunnel endpoint identifier) or a pair of an IP (internet protocol) address and a UDP (User Datagram Protocol) port configured to identify a tunnel generated for a session associated with a subscriber or a call the network; and wherein the input packets are GTP (GPRS (General Packet Radio Service) Tunneling Protocol) packets or SIP (Session Initiation Protocol) packets and RTP (Real Time Protocol) packets.

8. The method of claim 1, further comprising always forwarding an input packet to one or more egress ports where the subscriber identifier for the input packet is associated with a whitelist identifying packets to always forward even if the dynamic function does not determine the input packet to be a sampled packet.

9. The method of claim 1, wherein the input packets are received by a plurality of ingress ports, and wherein the sampled packets are output to a plurality of egress ports.

10. The method of claim 9, further comprising adjusting a sampling percentage or a sampling rate to address oversubscribed or overloaded conditions based upon feedback from the plurality of egress ports.

11. The method of claim 1, wherein the configuration information causes input packets associated with a selected percentage of hash values or a selected range of hash values to be forwarded as sampled packets.

12. A system to sample packets for network packet forwarding, comprising:
    an external controller configured to communicate configuration information, the configuration information identifying subscribers to sample; and
    a plurality of packet forwarding systems, each comprising:
        a controller configured to receive the configuration information from an external controller;
        ingress ports configured to receive control packets and user packets as input packets associated with subscribers within a network;
        one or more programmable integrated circuits including at least one of a processor or a programmable logic device programmed to identify unique subscriber identifiers associated with the input packets;

one or more programmable integrated circuits including at least one of a processor or a programmable logic device programmed to provide a sampler at each ingress port, each sampler being configured to sample the input packets by applying a dynamic function to the unique subscriber identifiers to determine which input packets to output as sampled packets, the dynamic function being based upon the configuration information and a hash function applied to the unique subscriber identifiers to generate hash values, and the dynamic function changing over time based upon the configuration information to select different subsets of subscribers to sample in different time periods; and a filter associated with each sampler, each filter being configured to forward sampled packets output by that sampler to one or more egress ports such that all sampled packets having a same hash value are forwarded to at least one common egress port;

wherein sampled packets across all of the plurality of packet forwarding systems having the same hash value are forwarded to one or more common monitoring tools based upon the configuration information.

13. The system of claim 12, wherein each sampler is further configured to compare the hash values to sampling parameters based upon the configuration information to determine whether or not to output the input packets as a sampled packets.

14. The system of claim 12, wherein each sampler is further configured to generate the hash values between a minimum value and a maximum value using the hash function, wherein a subset of values between the minimum value and the maximum value determines which input packets are output as sampled packets, and wherein the subset of values is adjusted over time based upon the configuration information such that all values are covered evenly over a time window including multiple adjustment time periods.

15. The system of claim 12, wherein each unique subscriber identifier comprises an IMSI (International Mobile Subscriber Identity) identifier or an MSISDNS (Mobile Subscriber International Subscriber Directory Number) identifier configured to uniquely identify a subscriber or a call in the network; wherein each of the session identifiers comprises a TEID (tunnel endpoint identifier) or a pair of an IP (internet protocol) address and a UDP (User Datagram Protocol) port configured to identify a tunnel generated for a session associated with a subscriber or a call the network; and wherein the input packets are GTP (GPRS (General Packet Radio Service) Tunneling Protocol) packets or SIP (Session Initiation Protocol) packets and RTP (Real Time Protocol) packets.

16. The system of claim 12, wherein each sampler is further configured to always identify an input packet as a sampled packet where the subscriber identifier for the input packet is associated with a whitelist configured to identify packets always to forward even if the dynamic function does not determine the input packet to be a sampled packet.

17. A system to sample packets, comprising:

an external controller configured to communicate configuration information with a plurality of packet forwarding systems, wherein the configuration information includes first and second sampling parameter values, and wherein the configuration information is used to identify subscribers that are to be sampled; and a plurality of packet forwarding systems, each comprising:

a controller configured to receive the configuration information from the external controller;

ingress ports configured to receive control packets and user packets as input packets associated with subscribers within a network;

one or more programmable integrated circuits including at least one of a processor or a programmable logic device programmed to:

apply a dynamic function to each input packet to generate a result value;

in response to determining that the result value is between the first and second sampling parameter values, select the packet for sampling; and forward the selected packet to an egress port;

wherein the dynamic function is used to select different subsets of subscribers to sample in different time periods based upon the configuration information.

18. The system of claim 17, wherein the dynamic function comprises a hash function applied to a unique subscriber identifier associated with each input packet to generate a hash value for each input packet, and wherein the first and second sampling parameter values determine a subset of hash values between minimum and maximum hash values to select for sampling.

19. The system of claim 17, wherein the plurality of packet forwarding systems each further comprise a controller adapted to receive feedback messages from egress ports within the packet forward system, the feedback messages providing operational parameters associated with the egress ports.

20. The system of claim 19, wherein the controller is further adapted to adjust sampling parameters including a sampling percentage or a sampling rate to address an oversubscribed or overloaded condition of one or more egress ports based upon the feedback messages so that the one or more egress ports are no longer oversubscribed or overloaded.

* * * * *